United States Patent Office 3,519,474
Patented July 7, 1970

3,519,474
LIGHT-DIFFUSING SURFACES FOR
GLASS-CERAMIC ARTICLES
Ann F. Bopp, Painted Post, N.Y., assignor to Corning
Glass Works, Corning, N.Y., a corporation of New York
No Drawing. Filed Feb. 2, 1967, Ser. No. 613,420
Int. Cl. C03c 17/22
U.S. Cl. 117—124           3 Claims

ABSTRACT OF THE DISCLOSURE

This invention relates to the formation of a light-diffusing and chemically resistant surface on a side of a sheet of glass-ceramic by applying a thermally-decomposable material, such as $CaCO_3$, to one surface of an uncerammed sheet of glass-ceramic and heating the sheet and $CaCO_3$, so as to react the $CaCO_3$ with the surface to form the desired surface and to ceram the uncerammed glass-ceramic.

BACKGROUND OF THE INVENTION

Glass-ceramics are ceramic bodies consisting of interlocking microcrystals in a glassy matrix. The glass-ceramic differs from a glass in that a nucleating agent has generally been added to the glass and upon proper thermal treatment, called ceramming, the microcrystals can be caused to nucleate and grow. This thermal treatment generally comprises holding the glass at a temperature at which the microcrystals will nucleate and then after solw heating holding the nucleated glass at a second temperature for a time sufficient to cause the nucleated crystals to grow. The glass before it is thermally treated is said to be in the uncerammed condition. The body is then cooled and its structure is usually more than 50% crystalline with the remainder being glass. U.S. Pat. No. 2,920,971 describes in detail the structure theory and thermal treatments relating to glass-ceramics.

This novel invention of glass-ceramic has resulted in the creation of many new products. On such product is sheet glass-ceramics. These sheets are strong, chemically durable and have many uses. For example, such sheets can be used for laboratory bench tops or for building cladding. For such purposes, they have many advantages such as a low coefficient of expansion as compared with metals, a white or gray basic color, good weather and chemical resistance, ease of cleaning and high strength.

However, the surface of these sheets is usually very glossy and reflective. This means that if an entire building was cladded with this material direct sunlight on the building would cause a brilliant, almost blinding reflection. Likewise, in a laboratory, light from lamps or outside sources could be reflected into the eyes of the person using the bench. This is not to say that there are no applications for glossy glass-ceramic sheets. The point is that for some applications, a light-diffusing surface is desirable.

DESCRIPTION OF THE PRIOR ART

Light-diffusing surfaces are known and have been obtained in a number of ways. Grinding an irregular surface is one method, another is to acid etch an irregular surface, a third is to apply a glass frit of various compositions to the surface and fuse the particles to the substrate surface thus creating an irregular surface, and the last is to apply to the desired surface an over-glaze of a dull color or a glaze which contains light-diffusing particles. However, the above prior art methods have proved unworkable or too expensive in trying to produce the desired surface on large (3′ x 8′) glass-ceramic sheets.

Therefore, in order to fully utilize the potential of sheet glass-ceramic, a method had to be found by which a light-diffusing surface could be created on the glass-ceramic sheet. A coating method seemed to be the best approach; however, the surface produced by the coating had to be weather resistant and/or chemically resistant. It had to be easily cleanable and stain resistant. Furthermore, the coating had to have a pleasing color and be useable with color additives. It is desirable to be able to apply the coating in a production line operation after forming of the sheet but before the ceramming thereof. Therefore, the coating should be easy to apply and inexpensive. Under some circumstances, it is desirable to chemically strengthen the sheet by ion exchange. Hence, another requirement is that the previously applied coating and resultant surface not block or prevent the chemical strengtheining of the glass-ceramic.

OBJECTS OF THE INVENTION

Therefore, the primary object of my invention is to produce an easily cleanable weather and chemically resistant light-diffusing surface on a glass-ceramic article.

The secondary object is to find an inexpensive method of obtaining a light-diffusing surface which may be used with colorants and which may be used on a production line basis.

The final object of my invention is to find a method of obtaining a light-diffusing surface which will not deleteriously affect subsequent chemical strengthening.

THEORY OF THE INVENTION

In accordance with the objects of my invention, I have discovered that by applying a thermally-decomposable compound to an uncerammed glass-ceramic substrate and ceramming this substrate, I can cause the compound to decompose, react with the substrate and form a light-diffusing surface thereon.

As used herein a thermally-decomposable compound is a compound which will decompose to its elemental constituents or compounds containing combinations thereof, at a temperature betweeen about room temperature and the softening point of the the uncerammed glass-ceramic. For example, a compound such as $CaCO_3$ which will thermally decompose at a temperature at or below the ceramming temperature will react with the substrate upon heating and after decomposition to form a light-diffusing surface.

It is theorized that the light-diffusing surface is formed in the following manner. Upon heating, a compound such as $CaCO_3$ decomposes to $CaO$ and $CO_2$, the $CO_2$ is evolved as a gas, and the remaining $CaO$ is in a "reactive state." The $CaO$ in contact with the uncerammed glass surface then reacts with the surface. Instead of leaching out a part of the surface, the $CaO$ and the uncerammed glass-ceramic react, nucleate and form microscopic crystals on the surface. These crystals grow essentially two-dimensionally along the surface, not in the third dimension, and eventually meet one and another. The crystal structure is believed to be of the diopside type from the pyroxene group. Thus, the surface has become a series of microscopic flat plate-like crystals which are essentially two dimensional. The thickness of these crystals is thought to be from 10 A. to 1000 A. These crystals are thought to grow radially outward from their nucleation sites and form a rough surface. Since it is recognized that a rough surface will diffuse light better than a smooth surface, the crystal growth has accomplished its main objective.

The foregoing statements offer a possible explanation of the mechanism of producing a light-diffusing surface on glass-ceramics. However, it is not intended to limit the present invention with respect to a particular theory or explanation.

It has been observed that the surface reaction and crystallization begins in the first few minutes generally 3 to 4 minutes after heating. During these first few minutes the initial nucleation of the microcrystals also begins. However, attempts to form this surface on a completely cerammed glass-ceramic have failed.

In order to obtain a good uniform light-diffusing surface it is necessary that the surface be cleaned. The preferred method of cleaning would be to rinse the surface to be cleaned with a hot 3% aqueous solution of ammonium bifluoride just prior to the application of the compound.

$CaCO_3$ when applied by itself to the surface of glass-ceramics of the following composition: $SiO_2$—64%; $Al_2O_3$—20%; $B_2O_3$—2%; $Na_2O$—.4%; $K_2O$—.2%; $MgO$—1.7%; $CaO$—.1%; $ZnO$—2.5%; $Li_2O$—3.6%; $TiO_2$—4.5%; $As_2O_3$—1.0%; was found to produce a light-diffusing surface, however, the surface had become discolored and was not readily cleanable. Nevertheless, when a diluent, such as $TiO_2$, is added to the $CaCO_3$ the surface was less discolored and more readily cleanable. The desirability of having colored surfaces was readily apparent since architects could then use a wider variety of colors for buildings than is presently available. Additives such as $Co_3O_4$ which produces a blue color can be added to the $CaCO_3$ and $TiO_2$ mixture.

It has also been found desirable to apply the coating in a uniform manner and with a maximum thickness. When too much is applied, the materials fuse to the surface, cause the substrate to bow and creates an undesirable surface.

A relationship has been found between the ceramming temperature, ratio of compound to diluent and thickness of application. In general, as the ceramming temperature is lowered, the ratio of compound to diluent must be increased and the thickness of applied coating must also be increased in order to obtain a good coating.

The coatings can be applied in a number of ways. One way would be to make an aqueous slurry which could be sprayed from an air spray gun and spray the uncerammed sheet at room temperature. A second way would be to apply the aqueous slurry with a roller or brush at room temperature. Other vehicles than water can be used so long as the vehicle will volatilize at a temperature below the decomposition or reaction temperatures. The compounds can be powdered and dusted onto a sheet at ambient temperatures or may be applied to the hot sheet, e.g., 600° C. Obviously, an aqueous slurry could not be so applied since the water would form steam and react violently.

EXAMPLES OF THE INVENTION

My invention is further illustrated and more specifically described in the following examples.

EXAMPLE 1

An aqueous slurry containing 62.5% $CaCO_3$, and 37.5% $TiO_2$ by weight and enough $H_2O$ so that the slurry could be sprayed using a DeVilbiss type EGA series 502 spray gun was applied to an uncerammed sheet of glass-ceramic. The glass-ceramic had about the following composition: $SiO_2$—64%; $Al_2O_3$—20%; $B_2O_3$—2%; $Na_2O$—.4%; $K_2O$—.2%; $MgO$—1.7%; $CaO$—.1%; $ZnO$—2.5%; $Li_2O$—3.6%; $TiO_2$—4.5%; $As_2O_3$—1.0%. The slurry was sprayed to a thickness of about .003 inch. The sprayed sample was then placed in a furnace, heated to 950° C., held at that temperature for ½ hour, then removed and allowed to cool. The residue was then easily removed and a white light-diffusing surface was observed.

EXAMPLE 2

An aqueous slurry containing 90% $CaCO_3$ and 10% $TiO_2$ by weight and enough $H_2O$ so that the slurry could be sprayed using a DeVilbiss type EGA series 502 spray gun was sprayed on an uncerammed sample sheet of glass-ceramic. The coating thickness was about .004 inch. The glass-ceramic composition was the same as in Example 1. The sprayed sample was then placed in a furnace, heated to 860° C., held at that temperature for ½ hour, then removed and allowed to cool. The residue was then easily removed and a gray light-diffusing surface was observed.

EXAMPLE 3

Dry powdered $CaCO_3$ was applied to a sheet of uncerammed glass-ceramic at 650° C. by vibrating a 60 mesh screen over the hot sheet through which the $CaCO_3$ can pass. The $CaCO_3$ was applied to a thickness of about .010 inch. The hot sheet and $CaCO_3$ coating were then heated to 950° C. for ½ hour. The residue was then removed and a white light-diffusing surface was observed.

A series of aqueous mixtures of 100% compound and no diluent was made up and applied to one sheet of uncerammed glass-ceramic. The glass-ceramic and the thermal treatment were the same as in Example 1.

| Example | Compound | Surface |
|---|---|---|
| 4 | $CdCO_3$ | Fused. |
| 5 | $MgCO_3$ | Light-diffusing. |
| 6 | $MgCl_2$ | Fused. |
| 7 | $ZnCl$ | Light-diffusing. |
| 8 | $ZnO$ | Do. |

The term fused is used to indicate that the compound adhered to itself and the substrate forming an unattractive hard crusty surface.

Another series of slurries using 50% compound 50% $TiO_2$ was sprayed in the same manner, onto the same glass-ceramic and thermally treated as in Example 1. The following table summarizes that data:

| Example | Compound | Surface |
|---|---|---|
| 9 | $BaCO_3$ | Light-diffusing. |
| 10 | $BaCl_2.H_2O$ | Do. |
| 11 | $BaF_2$ | Do. |
| 12 | $BaSO_4$ | Do. |
| 13 | $CaF_2$ | Do. |
| 14 | $CaSO_4$ | No reaction. |
| 15 | $CaCl_2$ | Light-diffusing. |
| 16 | $NaHCO_3$ | Do. |
| 17 | $NaF$ | No reaction. |
| 18 | $Na_2SiF_6$ | Do. |
| 19 | $SrF_2$ | Light-diffusing. |
| 20 | $SrCO_3$ | Do. |
| 21 | $Li_2SO_4.H_2O$ | Do. |
| 22 | $Li_2CO_3$ | Do. |
| 23 | $LiCl$ | No reaction. |
| B4 | $LiF$ | Do. |
| 25 | $K_2SO_4$ | Do. |
| 26 | $KCl$ | Light-diffusing. |
| 27 | $KF.2H_2O$ | No reaction. |
| 28 | $K_2CO_3$ | Light-diffusing. |

Several compounds from Examples 9–28 were mixed by themselves without any diluent, were sprayed in the same manner onto the same glass-ceramic and thermally treated as in Example 1. The following table summarizes the data:

| Example | Compound | Surface |
|---|---|---|
| 29 | 50% $BaCO_3$–50% $CaCO_3$ | Light-diffusing. |
| 30 | 50% $SrCO_3$–50% $CdCO_3$ | Do. |
| 31 | 10% $BaCO_3$–10% $SrCO_3$–80% $CaCO_3$ | Do. |

It should be noted that although all of the above do produce a coated surface, some compounds are less desirable than others because they may leave a residue which is difficult to clean off or the surface may not be uniformly light-diffusing.

For example, the alkali metal compounds have generally left a residue which indeed is more difficult to remove than the residue left by the alkaline earth metal compounds.

Some compounds which will produce a light-diffusing surface may not be soluble in water or for other reasons, an aqueous slurry may not be the best method of application. Hence, vehicles other than water can be used. Several compounds which could not be applied by using an aqueous slurry were silk screened onto the substrate. The silk screen slurry consisted of 50% compound and 50% $TiO_2$ by weight in an oil vehicle. The substrate composition and thermal treatment were the same as in Example 1.

| Example | Compound | Surface |
|---------|----------|---------|
| 32 | NaCl | Light-diffusing. |
| 33 | $Na_2CO_3$ | Do. |

In general, it has been found that if the ceramming temperature is kept constant and the ratio of $CaCO_3/TiO_2$ is varied, as the ratio increases the thickness of coating may be decreased. The following table shows the variation in coating thickness with ratio, all other factors are as in Example 1.

| Example | Ratio | Thickness |
|---------|-------|-----------|
| 34 | 90% $CaCO_3$–10% $TiO_2$ | .002–.005 |
| 35 | 80% $CaCO_3$–20% $TiO_2$ | .002–.004 |
| 36 | 70% $CaCO_3$–30% $TiO_2$ | .002–.004 |
| 37 | 60% $CaCO_3$–40% $TiO_2$ | .005 |
| 38 | 50% $CaCO_3$–50% $TiO_2$ | >.005 |

Under the same conditions as in Examples 1 through 33, $SiO_2$ and/or $ZrO_2$ were substituted for $TiO_2$. There was no difference in the apperance of the coating and it is felt that $SiO_2$ and $ZrO_2$ can be used in the same manner as $TiO_2$.

It has also been found that good light-diffusing surface can be produced through a range of temperatures using about the same conditions as in Example 1.

EXAMPLE 39

An aqueous slurry containing 100% $CaCO_3$ and no diluent was applied to the substrate and a light-diffusing surface was produced at 775° C.

EXAMPLE 40

An aqueous slurry containing 62.5% $CaCO_3$ and 37.5% $TiO_2$ was applied to the substrate and a light-diffusing surface was produced at 1050° C.

A light-diffusing surface can be obtained on other glass-ceramic substrates but the compound used to produce the surface is not necessarily the same. Therefore, as the glass-ceramic composition is changed, the compound may have to be changed.

EXAMPLE 41

An aqueous slurry containing 62.5% $CaCO_3$ and 37.5% $TiO_2$ by weight was sprayed, as in Example 1 on a substrate of the following composition: $SiO_2$—69.3%; $Al_2O_3$—19.7%; MgO—2.8%; $Li_2O$—2.5%; ZnO—1.5%; $ZrO_2$—3.2%; $SnO_2$—0.8%; $Na_2O$—0.2%; $K_2O$—<0.1%. The sprayed piece was then heated at 780° C. for 4 hours and then at 1050° C. for 4 hours. After cooling and cleaning, a light-diffusing surface was observed.

EXAMPLE 42

An aqueous slurry containing 50% $SrCO_3$ and 50% $TiO_2$ by weight was sprayed as in Example 1 on an uncerammed glass-ceramic substrate of the following composition: $SiO_2$—43.0%; $Al_2O_3$—30.2%; BaO—5.5%; $Na_2O$—13.9%; $TiO_2$—6.5%; $As_2O_3$—0.9%. The sprayed piece was then heated at 1050° C. for 1 hour, removed and cooled. After cleaning a light-diffusing surface was observed.

EXAMPLE 43

An aqueous slurry containing 50% $BaCO_3$ and 50% $TiO_2$ by weight was sprayed as in Example 1 on an uncerammed glass-ceramic substrate of the following composition: $SiO_2$—56.0%; CaO—0.2%; MgO—14.7%; $Al_2O_3$—19.7%; $TiO_2$—9.0%; $As_2O_3$—.4%. The sprayed piece was then heated at 820° C. for 2 hours and then at 1260° C. for 2 hours. After removal, cooling and cleaning a light-diffusing surface was observed.

EXAMPLE 44

An aqueous slurry containing 62.5% $CaCO_3$ and 37.5% $TiO_2$ by weight was sprayed as in Example 1 on an uncerammed glass-ceramic substrate of the following composition: $SiO_2$—63.8%; $Al_2O_3$—25.3%; MgO—3.7%; $Li_2O$—2.2%; $ZrO_2$—4.7%; $Na_2O$—.2%; $K_2O$—.1%. The sprayed piece was then heated at 820° C. for 4 hours, at 860° C. for 4 hours, and finally 1100° C. for 4 hours. After removal, cooling and cleaning a light-diffusing surface was observed.

EXAMPLE 45

A mixture of 70% $CaCO_3$ and 30% $TiO_2$ blended in squeegee oil was silk screened on a glass substrate having the following composition: $SiO_2$—69.7%; $Na_2O$—.3%; $K_2O$—.1%; $Li_2O$—2.6%; MgO—2.8%; $Al_2O_3$—17.9%; ZnO—1.0%; $TiO_2$—4.8%; $As_2O_3$—.9%. The silk screened piece was then heated at 880° C. for ½ hour and then at 1100° C. for 1½ hours. After removal, cooling and cleaning a light-diffusing surface was observed.

Hence, from the above examples it is seen that a wide variety of compounds, diluents, glass-ceramics, temperatures, times, coating thicknesses and compound/diluent ratios can be used in obtaining the desired coatings. All of the possible combinations have not been exemplified herein, however, it is obvious that one skilled in the art can make modifications in any of the above parameters and not depart from the spirit and scope of this invention.

I claim:

1. A method for producing a glass-ceramic article having a light-diffusing surface layer thereon comprising the steps of:
   (a) coating the surface of a glass article capable of being converted to a glass-ceramic article through heat treatment thereof with at least one thermally-decomposable compound selected from the group consisting of $CaCO_3$, $MgCO_3$, ZnCl, ZnO, $BaCO_3$, $BaCl_2$, $BaF_2$, $BaSO_4$, $CaF_2$, $CaCl_2$, $NaHCO_3$, $SrF_2$, $SrCO_3$, $Li_2SO_4$, $Li_2CO_3$, KCl, $K_2CO_3$, $CdCO_3$, NaCl, and $Na_2CO_3$;
   (b) exposing said coated glass article to a temperature within a range at which said compound will be decomposed and said glass article will be crystallized to a glass-ceramic article; and
   (c) maintaining said coated glass article within said temperature range for a period of time sufficient to crystallize said glass article to a glass-ceramic article and to thermally decompose said compound and cause it to react with the surface of the article to form a light-diffusing surface layer thereon.

2. A method according to claim 1 wherein a diluent selected from the group $TiO_2$, $ZrO_2$, and $SiO_2$ is included with said thermally-decomposable compound.

3. A glass-ceramic article having a light-diffusing surface layer thereon made in accordance with claim 1.

References Cited

UNITED STATES PATENTS

| 2,651,146 | 9/1953 | Stookey | 65—30 XR |
| 2,691,855 | 10/1954 | Armistead. | |
| 2,920,971 | 1/1960 | Stookey. | |
| 3,275,492 | 9/1966 | Herbert | 65—33 XR |

ALFRED L. LEAVITT, Primary Examiner

W. F. CYRON, Assistant Examiner

U.S. Cl. X.R.

117—169